United States Patent [19]

Röjestål

[11] Patent Number: 6,074,435
[45] Date of Patent: Jun. 13, 2000

[54] REMOTE SOFTWARE DOWNLOAD WITH AUTOMATIC ADJUSTMENT FOR DATA ACCESS COMPATIBILITY

[75] Inventor: Jonas Röjestål, Ekerö, Sweden

[73] Assignee: Telefonakiebolaget LM Ericsson (publ), Stockholm, Sweden

[21] Appl. No.: 08/961,446

[22] Filed: Oct. 30, 1997

[51] Int. Cl.[7] ..................................................... G06F 9/45
[52] U.S. Cl. .................................................................. 717/11
[58] Field of Search ................................ 395/712; 717/11

[56] References Cited

U.S. PATENT DOCUMENTS

| | | | |
|---|---|---|---|
| 5,155,847 | 10/1992 | Kirouac et al. | 395/200.51 |
| 5,247,683 | 9/1993 | Holmes et al. | 395/200.51 |
| 5,268,928 | 12/1993 | Hehr et al. | 375/8 |
| 5,337,044 | 8/1994 | Folger et al. | 340/825.44 |
| 5,359,730 | 10/1994 | Marron | 395/712 |
| 5,410,703 | 4/1995 | Nilsson et al. | 395/712 |
| 5,421,009 | 5/1995 | Platt | 395/600 |
| 5,430,878 | 7/1995 | Straub et al. | 395/712 |
| 5,444,861 | 8/1995 | Adamec et al. | 395/712 |
| 5,473,772 | 12/1995 | Halliwell et al. | 395/650 |
| 5,564,051 | 10/1996 | Halliwell et al. | 707/200 |
| 5,635,979 | 6/1997 | Kostreski et al. | 348/13 |
| 5,666,293 | 9/1997 | Metz et al. | 395/200.5 |
| 5,701,442 | 12/1997 | Ronen | 395/500 |
| 5,732,275 | 3/1998 | Kullick et al. | 395/712 |
| 5,761,504 | 6/1998 | Corrigan et al. | 395/652 |
| 5,764,992 | 6/1998 | Kullick et al. | 395/712 |
| 5,778,234 | 7/1998 | Hecht et al. | 395/712 |
| 5,832,275 | 11/1998 | Olds | 395/712 |
| 5,845,077 | 12/1998 | Fawcett | 395/200.51 |
| 5,845,128 | 12/1998 | Noble et al. | 395/712 |

OTHER PUBLICATIONS

Tabatabai et al. Efficient and Language–Independent Mobile Programs. ACM. pp. 127–136, May 1996.

Berzins. Software Merge: Semantics of Combining Changes to Programs. ACM. pp. 1875–1903, Nov. 1994.

*Primary Examiner*—Tariq R. Hafiz
*Assistant Examiner*—Wei Zhen
*Attorney, Agent, or Firm*—Jenkens & Gilchrist, P.C.

[57] ABSTRACT

In a method of replacing a first version of software with a second version of software, the second version of software is loaded into a data processor on which the first version of software is running. While the first version of software is running on the data processor, the first version of software is used to modify a data memory for compatibility with the second version of software.

11 Claims, 5 Drawing Sheets

REMOTE SOFTWARE DOWNLOAD WITH AUTOMATIC ADJUSTMENT FOR DATA ACCESS COMPATIBILITY

BACKGROUND OF THE INVENTION

In the field of data processing, software designers continually develop and release new versions of software having improved functionality relative to older versions of the software. In conventional computer systems, there are various reasons for substituting a newer version of software for an older version of software, and for substituting an older version of software for a newer version of software.

For example, when a new version of software includes improved functionality and/or improved diagnostic capabilities relative to an older version of the software, it is often desirable to replace the older version of software with the newer, improved version of software. As another example, if a spare or replacement component that has already been programmed with an older version of software is introduced into a system whose other components utilize a newer version of the software, then it may be desirable to modify the spare component to replace its older software version with the newer software version used in the other system components so that, for example, all system components are executing the same version of software.

In other instances, it may be desirable to replace a newer version of software with an older version of software. For example, if a new component that has already been programmed with a new version of software is introduced into an older system whose other components run an older version of the software, it may be desirable to modify the new component by replacing its newer version of software with the older version of software used in the other system components to, for example, ensure that all system components are executing the same version of software. As another example, if one component of a system is updated to run a newer version of software, and thereafter the system develops operational problems, then it may be desirable to change the software in that one component back to the older version that was in use before the operational problems arose.

In a distributed computer system wherein the various components can be geographically located quite remotely from one another, it is often desirable, when substituting one version of software for another version, to download the desired version of software from a remote source to a program memory in the desired destination. The download is typically executed via a connection that is otherwise used for other types of communication between the remote source and the data processor. For example, the remote source could be another data processor in the system, and the connection could be a communication bus connected between the data processors. This is illustrated in FIG. 1 wherein remote source 11 is connected by communication bus 23 to data processor 13 and performs a remote software download via bus 23 into program memory 15 of data processor 13.

Figure 1:
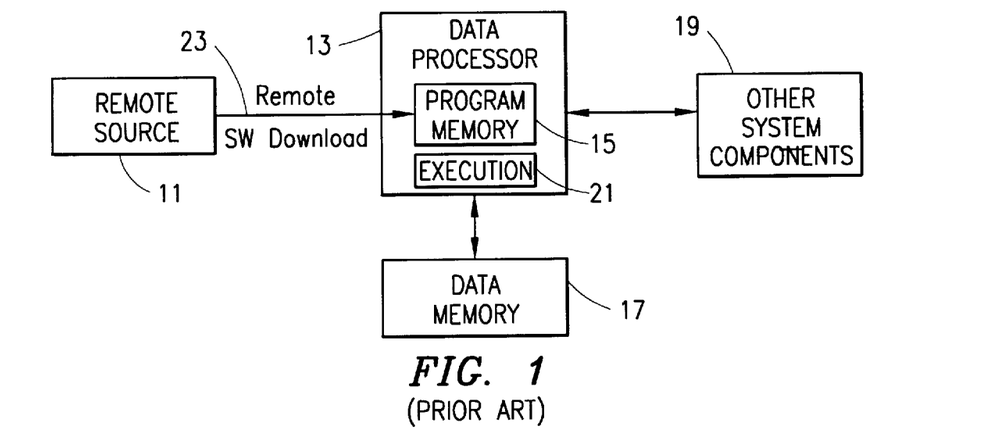
FIG. 1 illustrates a conventional distributed computer system wherein software from a source located remotely away from a data processor is downloaded into a program memory of the data processor.
Figure 2:
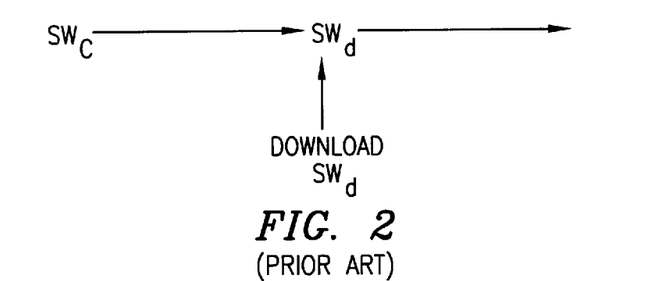
FIG. 2 illustrates conceptually the effect of downloading software from the remote source into the data processor of FIG. 1.

FIG. 2 illustrates the effect of the remote software download of FIG. 1. More specifically, the currently executing software SWc is executed by execution portion 21 of data processor 13 until the downloaded software SWd is downloaded from the remote source 11, at which time SWd begins to be executed by execution portion 21. Because the system already provides bus 23 for communication between the remote source 11 and data processor 13, and because the geographic location of data processor 13 may make it difficult to physically or manually access data processor 13, the bus 23 is advantageously used to perform the remote software download to data processor 13.

Figure 3:
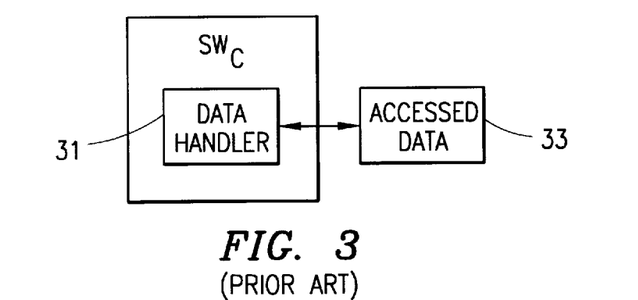
FIG. 3 illustrates the data handler portion and accessed data associated with the current software version shown in FIG. 2.
Figure 4:
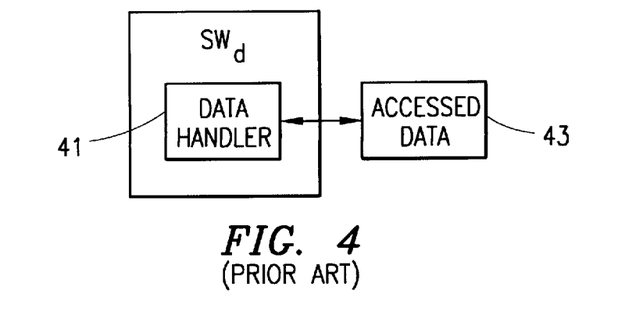
FIG. 4 illustrates the data handler portion and accessed data associated with the downloaded software version shown in FIG. 2.

FIGS. 3 and 4 respectively illustrate relevant portions of SWc and SWd in diagrammatic fashion. SWc and SWd are different versions of software. SWc includes a data handler portion 31 which handles data from data memory 17 of FIG. 1 differently than does the data handler portion 41 of SWd in FIG. 4. Thus, the data accessed at 33 by data handler 31 of SWc in FIG. 3 will not necessarily be compatible with the data handler 41 of SWd in FIG. 4, and the data accessed at 43 by data handler 41 of SWd will not necessarily be compatible with the data handler 31 of SWc in FIG. 3. For example, each of the different data handlers 31 and 41 of respective software versions SWc and SWd may require a different data format than the other one and/or may require a different data memory layout (or configuration) than the other one.

The accessed data in FIGS. 3 and 4 can be, for example, a database, a volatile memory such as a RAM, a non-volatile memory such as flash memory, floppy disk or hard disk, or a file format. As indicated above, SWc may require the accessed data to have a different format than is required by SWd, and SWc may require the data memory 17 to be configured differently than the memory configuration required by SWd. Thus, replacing SWc with SWd by remote download as illustrated in FIGS. 1 and 2 will often result in SWd attempting to access a data memory 17 whose data format and memory configuration is not compatible with that required by SWd.

One conventional approach to this problem is to design the original software version with a data handler that provides all possible data format and memory configuration parameters that could be needed by future versions of the software. In this manner, any version of the software would, when downloaded to replace another version, find data memory 17 having a data format and memory configuration that it requires. This is of course a very difficult task because it is virtually impossible to predict the data format and memory configuration that will be required by future versions of the software. Even if it were possible to perform this task, it would be extremely expensive to perform because of the extended amount of time necessary to predict all possible data formats and memory configurations that could be needed in the future.

Another conventional solution to the data access compatibility problem is visiting the site of data memory 17 and manually reformatting the data and reconfiguring the memory at the time that SWd is downloaded. Such manual intervention is very costly and time consuming (data memory 17 may be very remotely located), and may cause major disturbances in data flow to and from the other system components illustrated at 19 in FIG. 1.

Another conventional solution recognizes that the data handler of a newer version of software can, in most cases, handle the data format and memory configuration required by the data handlers of all previously released versions of the software. This solution is illustrated by the flow charts of FIGS. 5 and 6.

Figure 5:
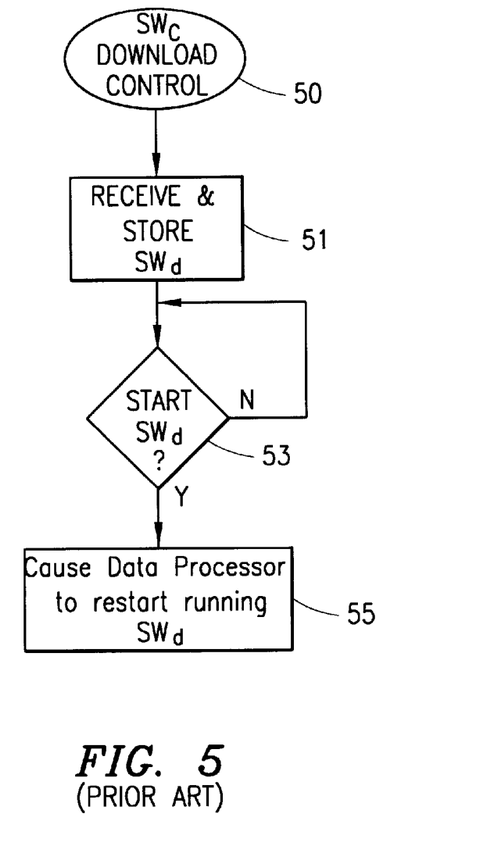
FIG. 5 is a flow diagram of a conventional download control portion of the current software version of FIG. 2.

FIG. 5 illustrates the download control of SWc. Recall from FIG. 2 that SWc is executing on data processor 13 until SWd is downloaded from remote source 11. The download control portion 50 of SWc receives and stores the SWd download at 51, and awaits at 53 a command from the remote source 11 to allow SWd to begin execution. When the remote source commands execution of SWd, SWc at 55 causes data processor 13 to restart, running SWd.

Figure 6:
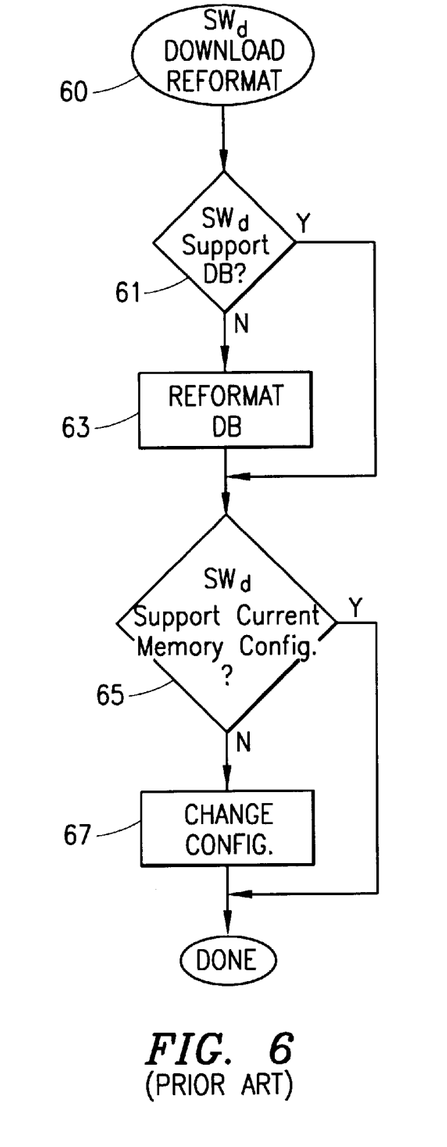
FIG. 6 is a flow diagram of a conventional download reformat portion of the downloaded software version illustrated in FIG. 2.

FIG. 6 illustrates the download reformat portion 60 of SWd. At 61, SWd determines whether or not it supports the current database (DB) format, which in most cases it will because it is a newer version of software than SWc. Nevertheless, if SWd does not support the current database format, then SWd, which is capable of handling the SWc format of the database, simply reformats the database to its preferred format at 63. At 65, SWd determines whether or not it supports the current memory configuration, which in most causes it will because it is a newer version of software than SWc. Nevertheless, if SWd does not support the current memory configuration, it uses its capability to handle the SWc memory configuration and simply changes the configuration to its own preferred configuration at 67.

It is again emphasized that the technique, illustrated in FIGS. 5 and 6, of downloading a newer version of software and having that newer version reformat the data and reconfigure the memory as needed, only addresses the relatively minor problem of data access incompatibility when a newer version of software replaces an older version of software. On the other hand, an older version of software generally cannot handle the data format and memory configuration used by later versions of software. Thus, in situations like those described above where an older version of software replaces a newer version of software, manual intervention must occur at the site of data memory 17 in order to manually reformat the data and reconfigure the memory for compatibility with the data handler of the older version of software that has been downloaded.

Another conventional approach is to update the data handler of every existing version of software whenever a new version of software with a different data handler and different data format and data configuration requirements is released. This is of course very costly and time consuming for the software vendor. Moreover, it is difficult to get such updated software into use in all customer systems. The customer does not want to "disturb" a system more than absolutely needed, which may force the supplier to provide system components which each have a different software version pre-programmed therein but are otherwise identical. The supplier must then keep track of which software version is used by which customer, and deliver equipment with that customer's software version programmed therein in order to avoid the above-described process of replacing a newer software version with an older software version when the equipment is installed in the system. This requirement of providing various equipments with different software versions therein and keeping track of which software versions are used by which customer systems adds more complexity to production of the equipment, which is very costly and time consuming for the supplier.

It is therefore desirable to provide for remote downloading of an older version of software to replace a newer version of software wherein the data format and memory configuration provided to the older version of software is compatible with the older version of software, without need for manual intervention at the site of the data memory, without need for updating the data handler portion of every software version whenever a new software version is released, and without need to design the earliest software version such that its data handler will be compatible with the data handlers of every subsequent future version of the software.

The present invention provides for remote downloading of an older version of software to replace a newer version of software wherein the downloaded older version of software encounters a data format and memory configuration with which it is compatible. The technique of the present invention does not require manual intervention at the site of the data memory, does not require updating the data handler of every existing version of software whenever a new version of software is released, and does not require the data handler of the first version of software to meet all data handling, data formatting and memory configuration needs of every subsequent version of the software released in the future.

DETAILED DESCRIPTION

Figure 7:
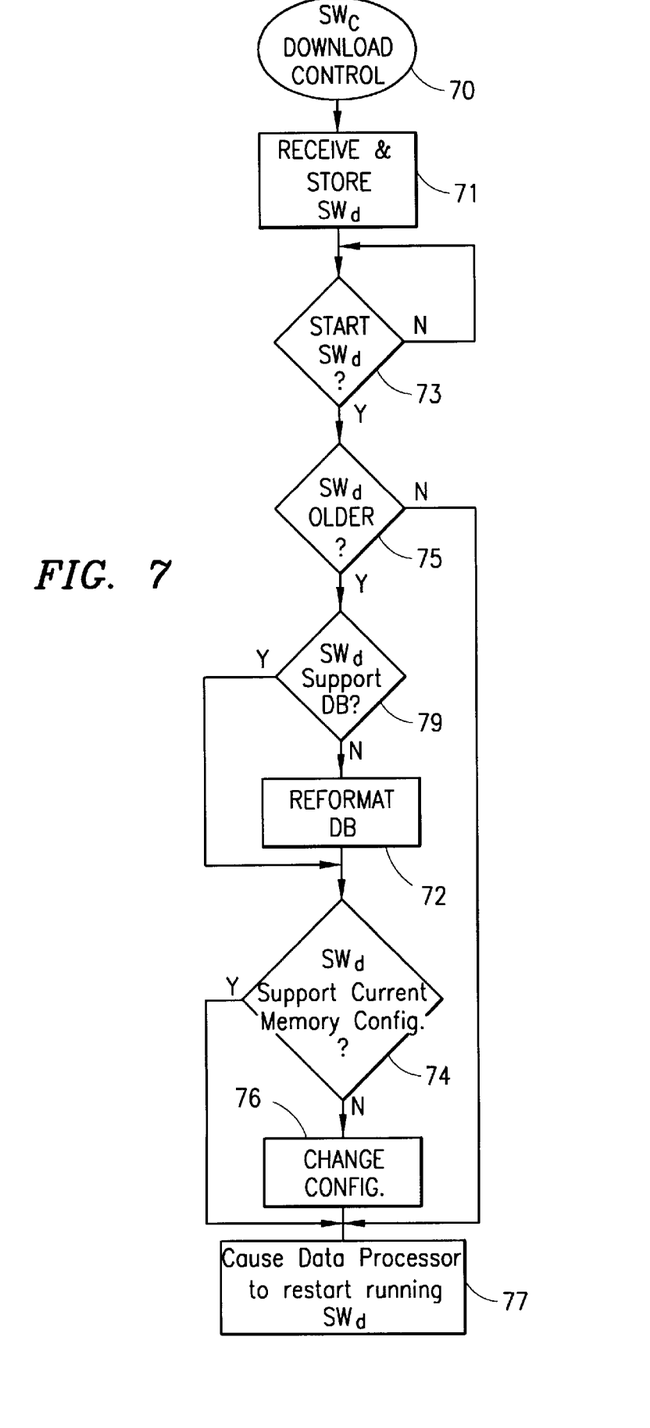
FIG. 7 is a flow diagram of a download control portion to be executed by the current software version according to the present invention.

Example FIG. 7 illustrates a download control routine 70 to be executed by the currently executing software SWc, according to the present invention. At 71, the downloaded software SWd is received and stored. At 73, SWc waits for a command from the remote source 11 to begin execution of SWd. When the command to begin execution of SWd is received, Swc determines at 75 whether or not SWd is an older software version than is SWc. This can be determined, for example, by comparing a status field in SWd with a corresponding status field in SWc.

If SWd is not an older version than SWc, then SWc at 77 causes the data processor to restart, running SWd. If the downloaded software SWd is older than the currently running software SWd, then SWc, by virtue of being a later version than SWd, determines at 79 whether or not the database is supported by SWd. If the database is not supported by SWd, then SWc reformats the database at 72. At 74, SWc determines whether or not SWd supports the current memory configuration. If SWd does not support the current memory configuration, then SWc at 76 changes the memory configuration to be compatible with SWd. Thus, SWc reformats the database only if necessary for compatibility with SWd, and SWc changes the current memory configuration only if necessary for compatibility with SWd. If the current database is compatible with SWd, then it remains unchanged, and if the current memory configuration is compatible with SWd, then it remains unchanged.

Figure 8:
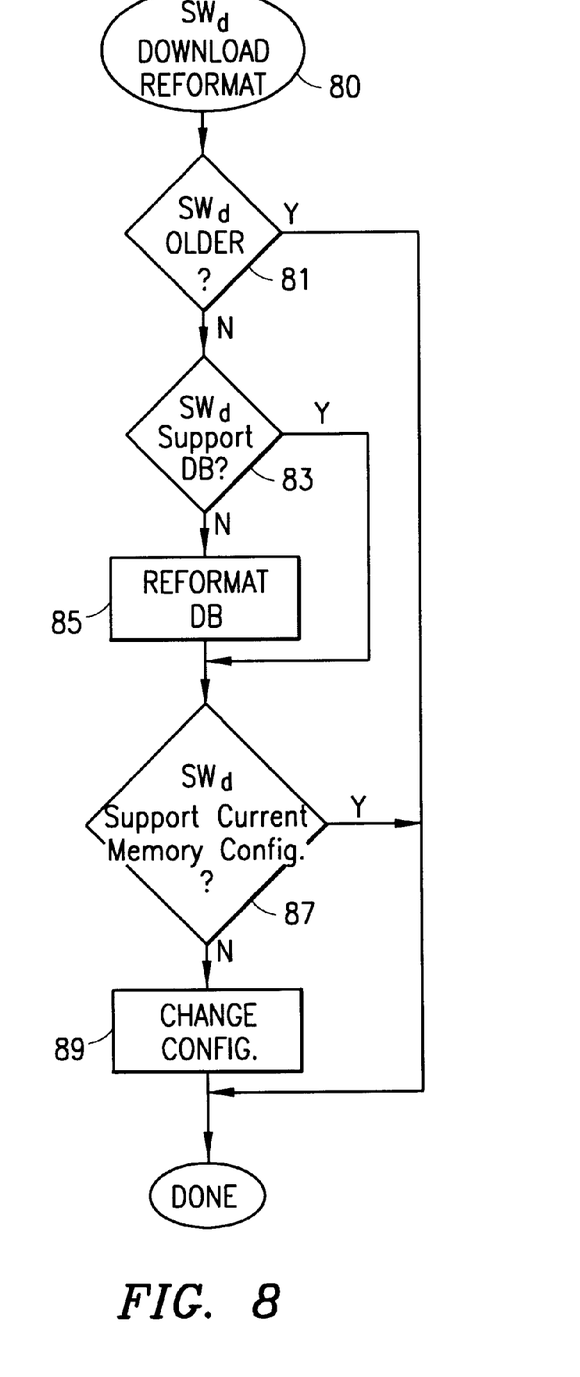
FIG. 8 is a flow diagram of a download reformat portion to be executed by the downloaded software according to the present invention.

Example FIG. 8 illustrates the download reformat portion 80 of the downloaded software SWd, according to the present invention. When SWc causes the data processor 13 to restart running SWd at 77 in FIG. 7, SWd then determines at 81 whether or not SWd is an older version than SWc. If so, then any necessary data reformatting and memory reconfiguration have already occurred at 72 and 76 of the download control portion of SWc in FIG. 7. If SWd is not older than SWc at 81, then SWd is a newer version than SWc. Thus, SWd determines at 83 whether or not it supports the current database format, and reformats as needed at 85, and then determines at 87 whether or not it supports the current memory configuration, and changes the configuration as needed at 89.

It can be seen from the foregoing description of FIGS. 7 and 8 that the combination of download control routine 70 of SWc and download reformat routine 80 of SWd provide for data format and memory configuration compatibility regardless of whether the downloaded software SWd is a newer version or an older version than currently executing software SWc.

Figure 9:
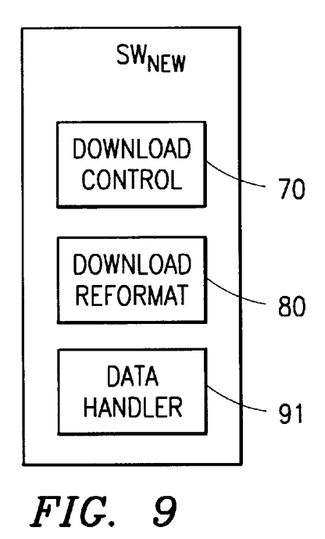
FIG. 9 illustrates pertinent portions of all new software versions according to the present invention.

Example FIG. 9 illustrates another feature of the present invention wherein all new software versions $S_{NEW}$ include download control routine 70 from FIG. 7 and download reformat routine 80 from FIG. 8, along with the unique data handler portion 91 associated with that particular version of software (and other unillustrated functional portions that are not necessary to understand the invention). With the download control 70 and download reformat 80 included in all software versions, whenever any software version is downloaded to replace any other software version, and regardless of which version is older, the download process will automatically render the data format and memory configuration compatible to the requirements of data handler 91. The currently executing software will execute the download control routine 70, while the downloaded software will execute the download reformat routine 80. Thus, the data processor will access data memory as needed to render its configuration and data format compatible with data handler 91.

Although data format and memory configuration are targeted for adjustment in the examples of FIGS. 7 and 8, any desired data access parameter can be adjusted using the procedures of FIGS. 7 and 8. For example, any desired target parameter could be considered at 83 or 79, and adjusted as needed at 85 or 72.

Also, data handler 91 of each new software release $S_{NEW}$ advantageously includes full knowledge of the manner in which all data handlers of previous versions handle data (e.g., data formats, memory configurations). Such information is readily available and easily included in new software releases. This information permits the software $S_{NEW}$ to determine the need for, and perform as needed, the reformat and reconfiguration functions shown in FIGS. 7 and 8.

Figure 10:
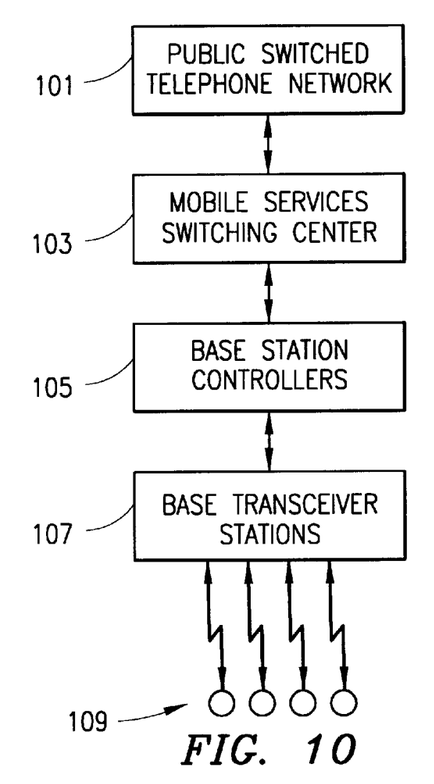
FIG. 10 illustrates diagrammatically a cellular telephone system incorporating the software download techniques of the present invention.

Example FIG. 10 illustrates a cellular telephone system which incorporates the above-described features of the present invention. As is conventional, a public switched telephone network 101 is connected to a mobile services switching center 103, which is in turn connected to base station controllers 105, which are in turn connected to base transceiver stations 107. The base transistor stations then are connected via the air interface to mobile communication devices such as mobile telephones at 109.

Figure 11:
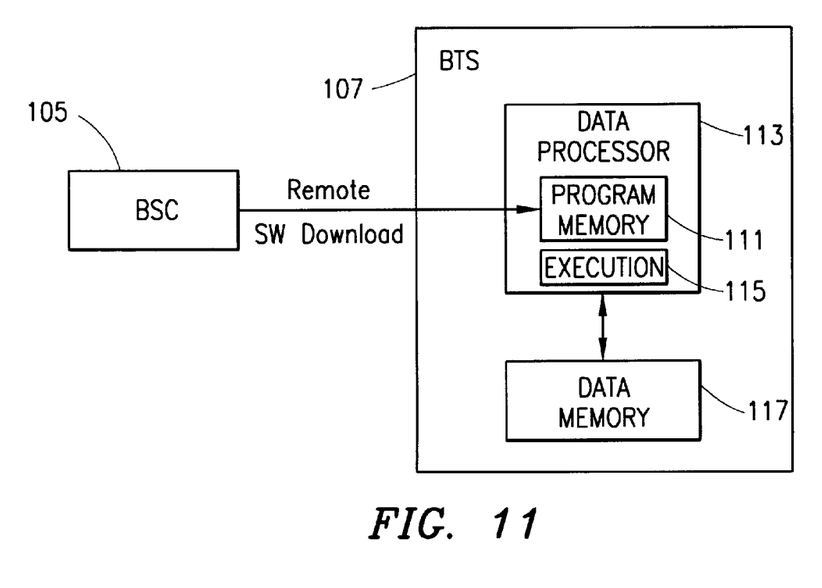
FIG. 11 illustrates one of the base station controllers and one of the base transceiver stations of FIG. 10 in greater detail.

Example FIG. 11 illustrates one of the base station controllers 105 of FIG. 10 executing a remote software download to a program memory 111 of a data processor 113 in one of the base transceiver stations 107. The base transceiver station (BTS) at 107 also includes data memory 117 connected to data processor 113, and data processor 113 includes execute portion 115 to execute software stored in program memory 111.

It should be noted that the "data" that is handled and reformatted by SWc and SWd could be in pure data or a program such as a library routine, and "data" memories 17 and 117 could hold pure data and/or one or more programs.

Some exemplary reasons why data in a database may need to be reformatted include: (1) to add a database element/parameter (with some default values) that was removed by SWc but is required by SWd; (2) to remove a database element/parameter that was added by SWc but is not supported by SWd; and (3) to change the size of a database element/parameter to a size supported by SWd, for example, the size of an error log may have been increased or decreased from one software release to another.

Some exemplary reasons for changing the memory configuration include: (1) to change the memory location of a database element/parameter such as an error log; (2) to change the memory location of a program stored in the memory; and (3) to change the storage structure of programs such as library routines that are stored in the memory, for example, changing between a "stacked" storage structure (wherein the software modules are stored in memory consecutively, one after another) and a "segmented" storage structure (wherein the software is divided into small segments and stored in the next free segment).

Using the present invention as described above, there are more possibilities to introduce new functions into a distributed system with less concern for forward and backward software capability. Also, the above-described disadvantages associated with the conventional solutions are avoided because all that is necessary according to the invention is to include the download control routine 70 and the reformat control routine 80 in each new software version, which is a virtually negligible expense in terms of time and money.

Although exemplary embodiments of the present invention have been described above in detail, this does not limit the scope of the invention, which can be practiced in a variety of embodiments.

What is claimed is:

1. A method of replacing a first version of software with a second version of software, comprising:

running on a data processor a first version of software that is to be replaced;

loading into the data processor a second version of software that is to replace the first version of software; and while running on the data processor, the first version of software examining the second version of software, determining from the second version of software that a memory should be modified for compatibility with the second version of software, and modifying the memory for compatibility with the second version of software.

2. The method of claim 1, including using the first version of software to modify the memory only if the second version of software is an earlier version than the first version of software.

3. The method of claim 1, wherein said step of loading the second version of software includes downloading the second version of software from a source apparatus into the data processor via a communication path that exists between the data processor and the source apparatus and that is also used for other communications between the source apparatus and the data processor.

4. The method of claim 1, wherein the data processor and memory are provided in a base transceiver station of a cellular telephone system, and wherein the second version of software is loaded into the data processor from a base station controller of the cellular telephone system.

5. The method of claim 1, wherein the first version of software modifies one of (a) the format of data in the memory and (b) the memory configuration of the memory.

6. A data processing apparatus, comprising:

a memory;

a data processor connected to said memory, said data processor including a program memory and an execution portion for executing a first version of software stored in said program memory, said data processor having an input for receiving a second version of software that is to replace the first version of software; and said first version of software, while being executed by said execution portion, responsive to receipt of the second version of software at said input for examining the second version of software, determining from the second version of software that said memory should be modified for compatibility with the second version of software, and modifying said memory for compatibility with said second version of software.

7. The apparatus of claim 6, including a source apparatus for providing said second version of software, and a communication path coupling said source apparatus to said input of said data processor, wherein said communication path carries said second version of software from said source apparatus to said data processor, and wherein said communication path also carries between said source apparatus and said data processor information other than software.

8. The apparatus of claim 7, wherein said communication path includes a communication bus.

9. The apparatus of claim 6, wherein said data processing system is a cellular telephone system, and wherein said memory and said data processor are provided in a base transceiver station of said cellular telephone system, and including a base station controller connected to said input of said data processor for providing said second version of software to said input of said data processor.

10. The apparatus of claim 6, wherein said data processor uses said first version of software to access and modify said memory only if said second version of software is an earlier version than said first version of software.

11. The apparatus of claim 6, wherein said data processor modifies one of the format of data in the memory and (b) the memory configuration of the memory.

\* \* \* \* \*

UNITED STATES PATENT AND TRADEMARK OFFICE
CERTIFICATE OF CORRECTION

PATENT NO. : 6,074,435
DATED : June 13, 2000
INVENTOR(S) : Jonas Röjestål

It is certified that error appears in the above-indentified patent and that said Letters Patent is hereby corrected as shown below:

Column 3, line 10    Please replace "causes" with --cases--.

Column 6, line 2    Please replace "transistor" with --transceiver--.

Signed and Sealed this

Twenty-second Day of May, 2001

Attest:

NICHOLAS P. GODICI

*Attesting Officer*    *Acting Director of the United States Patent and Trademark Office*